(12) United States Patent
Smetana et al.

(10) Patent No.: US 7,854,305 B2
(45) Date of Patent: Dec. 21, 2010

(54) SPRAG

(75) Inventors: Tomas Smetana, Erlangen (DE); Frank Straub, Hohenroth (DE); Frieder Altmann, Pommersfelden (DE); Volker Ploetz, Herzogenaurach (DE)

(73) Assignee: Schaeffler KG, Herzogenaurach (DE)

( * ) Notice: Subject to any disclaimer, the term of this patent is extended or adjusted under 35 U.S.C. 154(b) by 784 days.

(21) Appl. No.: 11/795,469

(22) PCT Filed: Dec. 13, 2005

(86) PCT No.: PCT/EP2005/013360

§ 371 (c)(1),
(2), (4) Date: Aug. 1, 2007

(87) PCT Pub. No.: WO2006/076950

PCT Pub. Date: Jul. 27, 2006

(65) Prior Publication Data

US 2008/0078640 A1    Apr. 3, 2008

(30) Foreign Application Priority Data

Jan. 18, 2005    (DE) .................. 10 2005 002 252

(51) Int. Cl.
*F16D 41/07*    (2006.01)

(52) U.S. Cl. .................................. 192/41 A; 192/45.1
(58) Field of Classification Search ............... 192/41 A; 188/82.8
See application file for complete search history.

(56) References Cited

U.S. PATENT DOCUMENTS

| | | | |
|---|---|---|---|
| 3,326,342 A | 6/1967 | Hack | |
| 3,547,239 A | 12/1970 | Titt | |
| 5,518,094 A | 5/1996 | Myrick | |
| 6,997,295 B2 * | 2/2006 | Pederson et al. | 192/41 A |

FOREIGN PATENT DOCUMENTS

| | | |
|---|---|---|
| DE | 14 50 158 A | 3/1969 |
| DE | 14 50 158 A1 | 3/1969 |
| DE | 37 41 518 C2 | 6/1989 |
| DE | 197 34 962 A1 | 2/1999 |
| WO | WO 2004/005742 A1 | 1/2004 |

* cited by examiner

*Primary Examiner*—David D Le
*Assistant Examiner*—Ryan Dodd
(74) *Attorney, Agent, or Firm*—Charles A. Muserlian

(57) ABSTRACT

A sprag for a sprag-type freewheel clutch having a profile comprised of multiple profile sections, the sprag having at least the profile sections of an inner engagement curve, an outer engagement curve and a first and a second lateral curve, wherein the outer and inner engagement curves each form a component of a logarithmic spiral.

6 Claims, 2 Drawing Sheets

SPRAG

This application is a 371 of PCT/EP2005/013360 filed Dec. 13, 2005.

FIELD OF THE INVENTION

The invention relates to a sprag for a sprag-type freewheel clutch.

BACKGROUND OF THE INVENTION

Sprag-type freewheel clutches are used as one-way clutches in automatic transmissions or in conveyors, for example. They transmit torsional loads in one direction only, the so-called locking direction. In the other direction, the idling direction, sprag-type freewheel clutches move freely. In order to achieve such an effect, sprag-type freewheel clutches comprise an inner race and an outer race, which are concentric with one another and by virtue of their spacing thereby define a gap size H, and sprags, which are arranged so that they can tilt between the races.

On their wedging surfaces the sprags have a convex wedging face. These faces are designed in such a way that a variation of the tilting angle produces a variation of the sprag height in a radial direction. In order to initiate an engagement sequence, the sprags are pressed, by means of springs, for example, against the wedging tracks, which are defined by the races. The direction of the tilting movement depends on the relative movement of the two races. Thus the relative movement in one direction leads to a tilting movement, which reduces the radial sprag height and hence the friction (idling direction), and in the other direction leads to a tilting movement, which increases the radial sprag height, so that a frictional connection is established and torques can be transmitted.

Given a suitably selected center of mass, at a specific relative angular velocity in the idling direction, the centrifugal force acting on the sprags due to the moments of inertia created by the asymmetrical geometry increases to a magnitude which causes the sprags to pivot about an axis, so that a clearance occurs between the sprags and the outer race. A wear-free idling operation is thereby ensured. Such a sprag-type freewheel clutch is disclosed by U.S. Pat. No. 2,824,635, for example.

In this case differing requirements are set for the sprags, depending on the particular application. They are intended to have a low mass, in order that they will have a low mass moment of inertia, and at the same time they should possess a high degree of stiffness. A long wedging contour is advantageous, in order to be able to cover the largest possible tolerances between a shaft and a bore, with a simultaneously low level of stress. Sprags should furthermore have a high tipping load and great freedom of movement in the cage.

In order to increase the stiffness, the sprags, according to DE 1 450 158, for example, are designed so that their curved sections, extending as a mirror image of one another and braced against the outer and inner races, derive laterally inverted from a circular arc section with an adjoining logarithmic curve section. In this case the circular arc sections represent between 3/10 and 5/10 of the overall curved sections. The circular arc sections in the first part serve for the freewheeling state and the remaining part and the logarithmic curve section produce the locking. At the same time the logarithmic curve section is designed so that the angle between the normals at the point of contact and the radius vector is constant over the whole logarithmic curve section, so that as the sprag rolls the engagement angles remain the same. Sprag tilting movements due to the eccentricity of a race thereby have little effect on the engagement angle.

The sprag disclosed in DE 1 450 158, however, has a large mass. In addition, a circular arc component is needed for the freewheel range; the engagement angle varies in this range. Furthermore it is designed for a specific pairing of an inner and an outer race. If the gap size H is different in another application, the specific geometric shape of the sprag means that it is not sufficient simply to scale this, because the stiffness varies as a function of its position, that is to say its orientation in a radial direction.

OBJECT OF THE INVENTION

The object of the invention is therefore to create a sprag, which has a small mass and at the same time possesses a high, constant stiffness, and which can be adapted to different pairs of races simply by scaling.

DISCLOSURE OF THE INVENTION

The object of the invention is achieved by the characterizing features of patent claim 1, in that the entire outer and inner engagement curves of the sprag each form a component of the same logarithmic spiral.

The sprag profile is composed of the outer and inner engagement curves and of the lateral curves. The engagement curves here derive from a logarithmic spiral, and the lateral curves adjoin these with tangential transitions. The fact that the entire outer and inner engagement curves lie on one logarithmic spiral means that the engagement angle $\alpha$ is constant. It is constant irrespective of the load and remains constant even if the gap size H varies. The sprag according to the invention thereby not only compensates for the eccentricities of a cylindrical race, thereby increasing the service life; it is secondly also especially well suited to eccentric shafts, since even then the load distribution in a circumferential direction on the sprag-type freewheel clutch is constant. Finally, it is, by virtue of its topology, scalable, which means that in applications that call for different gap sizes it only needs to be extended to the matching size by similarity transformation; no change in its shape is necessary.

The fact that the engagement curves of the sprag according to the invention lie on the same logarithmic spiral means that the parameters of the equation $$r(\varphi) = r_0 \exp\!\left(\varphi \cot\!\left(\tfrac{\pi}{2} - \alpha\right)\right)$$

on which the logarithmic spiral is based, are the same for the outer and the inner engagement curves, where $\alpha$ denotes the engagement angle of the sprag, measured between two parallel planes, and cot stands for the cotangent function. Here the radius vector $r_0$ at the point where $\phi=0$ is:

$$r_0 = \frac{H}{\cos\alpha}\left[1 + \exp\!\left(\pi \cot\!\left(\tfrac{\pi}{2} - \alpha\right)\right)\right]^{-1}.$$

In general, due to the more unfavorable curvature ratio the Hertzian stress on the inner engagement curve is greater than on the outer engagement curve. Since the service life of a sprag-type freewheel clutch depends primarily on the pitting that occurs on the inner engagement curve of the sprag, the service life is usually limited due to this effect. In the case of the sprags according to the invention, the Hertzian stress on the inner engagement curve is precisely the same as on the outer engagement curve. The service life is thereby increased.

It is especially advantageous if the angles covered on the logarithmic spiral are approximately equal and in the order of 57°-59°. Particular care is to be taken here to ensure that the contour of the logarithmic spiral is adhered to even at the lateral ends, and premature rounding does not already ensue in the direction of the lateral curves, since then the functioning of the sprag is impaired. For production reasons, it is therefore advisable to make the chosen range of the angle covered somewhat larger than necessary, in order that machining inaccuracies do not lead to unwanted operating restrictions. It has emerged here that a lengthening of the inner and outer engagement curves on the logarithmic spiral by up to 3 degrees in each direction avoids this problem, so that the angle covered in each case is 60°-63°.

The second lateral curve is composed of two circular arcs with a tangential transition and the first lateral curve of one circular arc and a straight segment with a tangential transition, so that the sprag is speed-lifting. For this purpose, the center of gravity of the sprag is always close to but not on the straight connecting line defined by the contact points of the sprag with the inner race and those with the outer race.

The straight segment of the first lateral curve fulfils several functions. For one thing, a spring, such as a spring projection of a strip spring, can bear particularly advantageously on the straight line in the area of the sprag constriction. The sprag, arranged in a cage, for example, then bears flatly with the straight segment against its cage when a certain speed limit is exceeded. The ever-increasing centrifugal force due to the rising speed can thereby be dissipated to the outer race via the cage, and the spring is protected from excessive stresses. The straight segment connected to the first lateral curve moreover facilitates assembly, since it is advantageous in the machine filling of a sprag-type freewheel clutch to make the design of the lateral curves as different as possible, in order to ensure easy identification of the sides and thereby to avoid fitting in the incorrect position.

All variables describing the sprag can be parameterized as a fractional multiple of a gap size H between the inner race and the outer race, predetermined by the application. A sprag designed in this way can thereby be scaled to any size and hence used for many different spacings of an inner race and an outer race. With sprags of prior art this is not the case, since when the spacing increases, the curvature ratios in the freewheel clutch also vary, and a simply extended sprag is then subject to different load stresses. In the sprag according to the invention, on the other hand, the stiffness is virtually constant. A costly redevelopment of a suitable sprag contour is eliminated.

The inventive sprag as claimed in claim 6 is designed for optimum mass and furthermore exhibits low notch stresses in the area of the minimum diameter. Owing to the special mass distribution in conjunction with the external contour of the logarithmic spiral, the twist angle characteristic curve for the sprag-type freewheel clutch with the optimized sprag runs linearly to the tipping point. The tipping load of the sprag-type freewheel clutch at the minimum gap thereby increases considerably. If such a high tipping load with simultaneously low notch stresses is not essential, it is possible to fit the sprag-type freewheel clutches with fewer sprags for the same load-bearing capacity, which results in weight and cost savings.

BRIEF DESCRIPTION OF THE DRAWING

For further explanation of the invention, reference will be made to the drawings, in which exemplary embodiments of the invention are represented in simplified form, and in which.

DETAILED DESCRIPTION OF THE DRAWINGS

Figure 1:
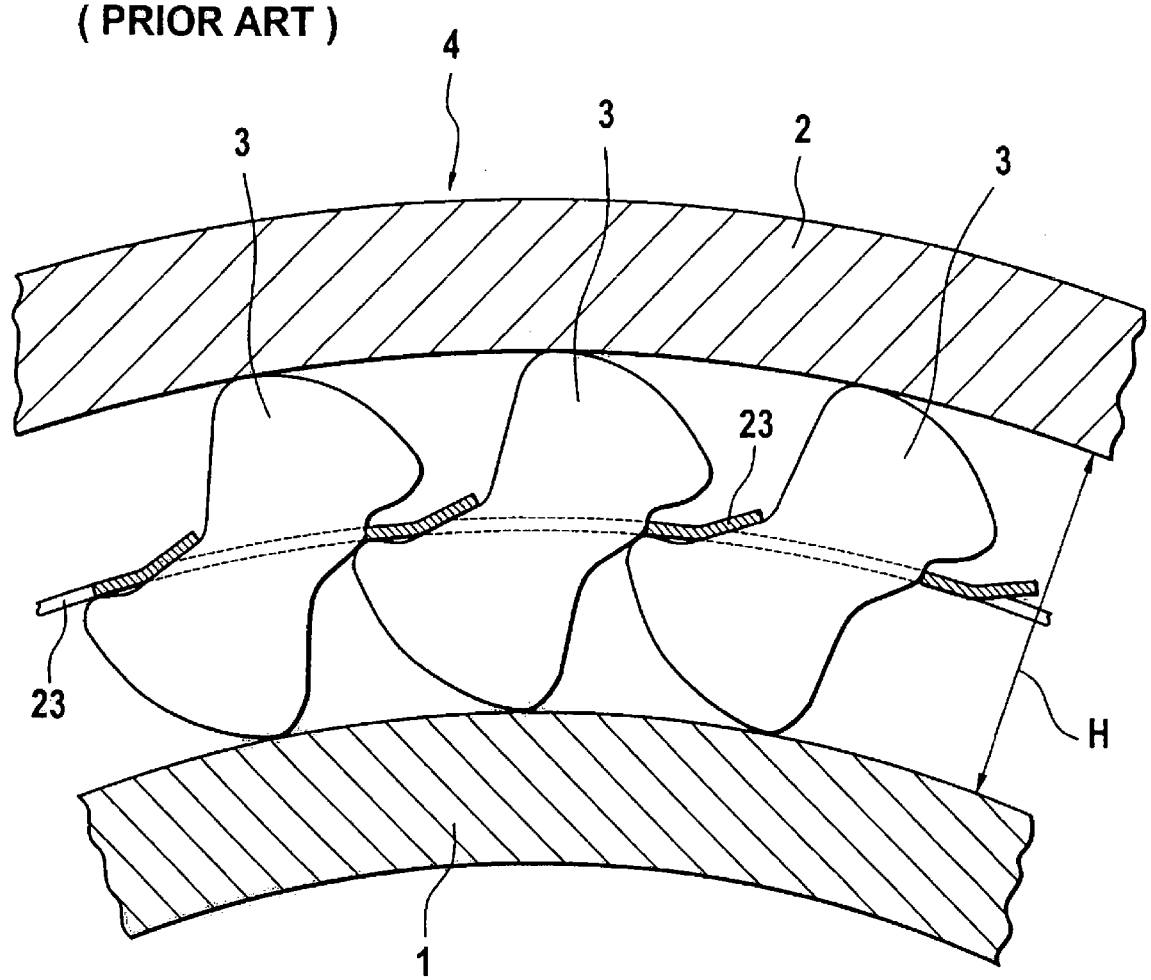
FIG. 1 shows a detail from a side view of a sprag-type freewheel clutch of prior art.
Figure 3:
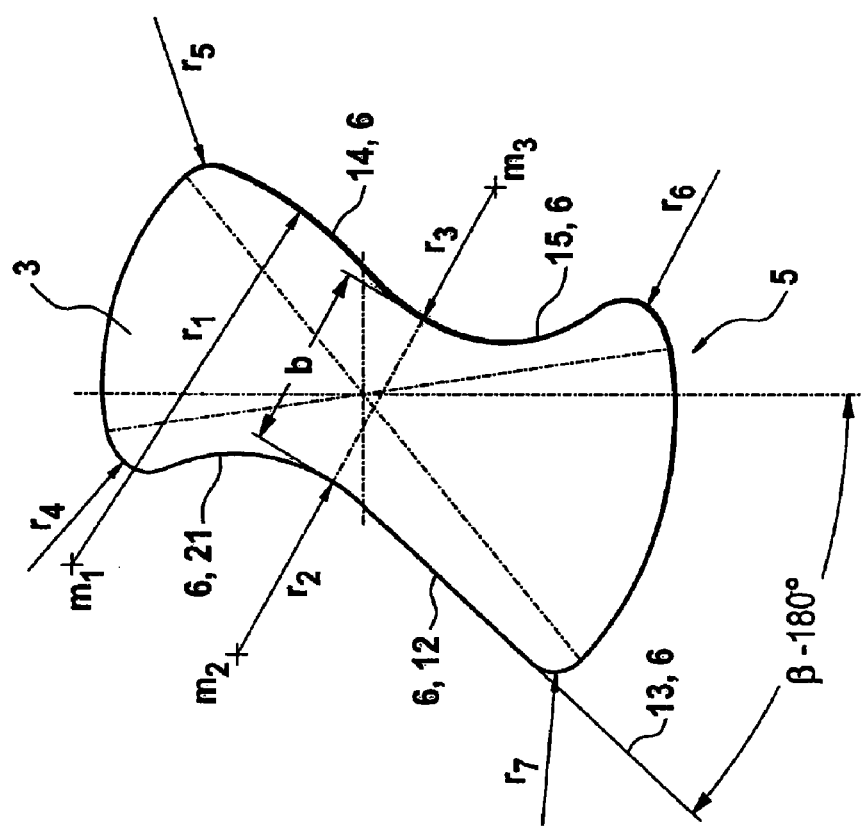
FIG. 3 shows a cross section through the sprag according to the invention in FIG. 2, with detailed design data.
Figure 2:
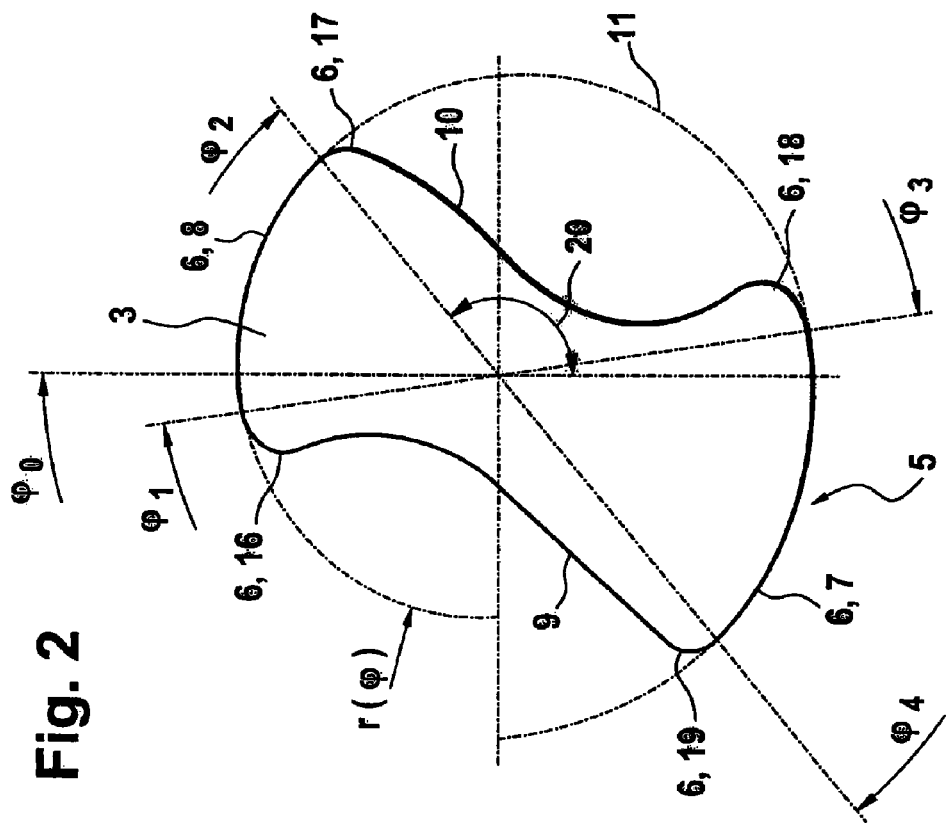
FIG. 2 shows a cross section through a sprag according to the invention.

Where shown in detail in FIG. 1, 1 denotes an inner race, 2 an outer race and 23 a spring element arranged between them, sprags 3 being arranged between the inner race 1 and the outer race 2. Together these form the basic functional unit of a sprag-type freewheel clutch 4. FIGS. 2 and 3 show a cross section of a profile 5 of a sprag 3 according to the invention, the profile sections 6 of which are formed from an inner engagement curve 7, an outer engagement curve 8, a first lateral curve 9, a second lateral curve 10, and connecting circular sections 16, 17, 18, 19. The inner engagement curve 7 and the outer engagement curve 8 have the contour of a logarithmic spiral 11. The contour of the first lateral curve 9 is described by a straight segment 12 on a carrier straight line 13 with an adjoining, inwardly convex pitch circle 21, and the second lateral curve 10 is composed of two adjoining, oppositely convex circular segments 15, 16. The inner and outer engagement curves 7, 8 are here connected to the first and second lateral curves 9, 10 by connecting circular sections 16, 17, 18, 19. The precise design of the connecting circular sections 16, 17, 18, 19 is of lesser importance here. They may also be of some other design form, provided that they connect the engagement curves and the lateral curves tangentially, without having any edges.

In an advantageous embodiment the connecting circular sections 16, 17, 18, 19 merge tangentially into the engagement curves 7, 8 and the lateral curves 9, 10. For optimum stiffness, the radius vector in the case of the inner and outer engagement curves 7, 8 covers an angle of 58°. Owing to the more unfavorable curvature ratio of the inner race 1, the angular distance 20 between the outer engagement curve 8 of the sprag 3 and its inner engagement curve 7, which passes over the second lateral curve 10, is 110 to 118 degrees. An optimum weight reduction of the sprag 3 with a simultaneously high stiffness is achieved if this is of wasted design and its minimum width b is approximately 31% of the gap size H.

The characteristics of the sprag 3 are greatly dependent on it precise profile. FIG. 3 shows an especially advantageous sprag 3 having several profile sections 6. The following angle data relate to the parameter φ of the logarithmic spiral 11 and are to be interpreted in a mathematically negative direction (clockwise) The abscissa is formed by the radius vector where φ=0°, the ordinate by the radius vector where φ=90°. With a given gap size H and parameterization of the logarithmic spiral 11 by the aforementioned formulae, the sprag 3 is defined by the following characteristics:

Each profile section 6 merges tangentially into the next profile section 6.

The logarithmic spiral (11) is defined by the parameters $$r(\varphi) = r_0 \exp\left(\varphi \cot\left(\frac{\pi}{2} - \alpha\right)\right) \text{ and } r_0 = \frac{H}{\cos\alpha}\left[1 + \exp\left(\pi \cot\left(\frac{\pi}{2} - \alpha\right)\right)\right]^{-1}$$

where r denotes the radius and α the engagement angle of the sprag, measured between two parallel planes.

The abscissa is formed by the radius vector where $\varphi=0°$, the ordinate by the radius vector where $\varphi_0=90°$.

The outer engagement curve (8) extends from $\varphi_1=82°$ to $\varphi_2=133°$.

The inner engagement curve (7) extends from $\varphi_3=261°$ to $\varphi_4=320°$.

The first circular segment (14) of the second lateral curve (10) lies on the circle with the center $m_1$ having the coordinates (−0.3 H; +0.5 H) and the radius $r_1=0.7$ H.

The pitch circle (21) lies on a circle with the center $m_2$ having the coordinates (−0.4 H; +0.2 H) and the radius $r_2=0.3$ H.

The second circular segment (15) of the second lateral curve (10) lies on a circle, the center $m_3$ of which is 0.9 H away from the center of the pitch circle (21) and 0.3 H from the ordinate, between the outer and inner engagement curves. Its radius is $r_3=0.3$ H.

The straight segment (12) of the first lateral curve (10) extends from the intersection of the pitch circle (21) with the ordinate at an angle of $\beta=180°+42°$ in the direction of the inner engagement curve (7).

The connecting circular section (16), which connects the pitch circle (21) to the outer engagement curve (8), has a radius of $r_4<0.1$ H.

The connecting circular section (17), which connects the outer engagement curve (8) to the first circular segment (14), has a radius of $r_5<0.1$ H.

The connecting circular section (18), which connects the second circular segment (15) to the inner engagement curve (7), has a radius of $r_6<0.1$ H.

The connecting circular section (19), which connects the inner engagement curve (7) to the straight segment (12), has a radius of $r_7<0.1$ H.

A sprag of the following design has proved particularly advantageous:

Each profile section 6 merges tangentially into the next profile section 6.

The logarithmic spiral (11) is defined by the parameters $$r(\varphi) = r_0 \exp\left(\varphi \cot\left(\frac{\pi}{2} - \alpha\right)\right) \text{ and } r_0 = \frac{H}{\cos\alpha}\left[1 + \exp\left(\pi \cot\left(\frac{\pi}{2} - \alpha\right)\right)\right]^{-1},$$

where r denotes the radius and α the engagement angle of the sprag, measured between two parallel planes.

The abscissa is formed by the radius vector where $\varphi=b\ 0°$, the ordinate by the radius vector where $\varphi_0=90°$.

The outer engagement curve (8) extends from $\varphi_1=80°$ to $\varphi_2=141°$.

The inner engagement curve (7) extends from $\varphi_3=259°$ to $\varphi_4=320°$.

The first circular segment (14) of the second lateral curve (10) lies on the circle with the center $m_1$ having the coordinates (−0.286 H; +0.508 H) and the radius $r_1=0.715$ H.

The pitch circle (21) lies on a circle with the center $m_2$ having the coordinates (−0.429 H; +0.222 H) and the radius $r_2=0.334$ H.

The second circular segment (15) of the second lateral curve (10) lies on a circle, the center $m_3$ of which is 0.929 H away from the center of the pitch circle (21) and 0.373 H from the ordinate, between the outer and inner engagement curves. Its radius is $r_3=0.286$ H.

The straight segment (12) of the first lateral curve (10) extends from the intersection of the pitch circle (21) with the ordinate at an angle of $\beta=180°+42°$ in the direction of the inner engagement curve (7).

The connecting circular section (16), which connects the pitch circle (21) to the outer engagement curve (8), has a radius of $r_4=0.064$ H.

The connecting circular section (17), which connects the outer engagement curve (8) to the first circular segment (14), has a radius of $r_5=0.048$ H.

The connecting circular section (18), which connects the second circular segment (15) to the inner engagement curve (7), has a radius of $r_6=0.079$ H.

The connecting circular section (19), which connects the inner engagement curve (7) to the straight segment (12), has a radius of $r_7=0.056$ H.

The sprag 3 demonstrated in FIG. 3 has, over a wide range, a linear twist angle characteristic curve that describes the torsional moment as a function of the twist angle. The gradient of this characteristic curve is a measure of the stiffness of the sprag 3. The linear correlation therefore means that the stiffness does not vary as a function of the twist angle. In particular, this applies even in the range close to the tipping point of the sprag 3. The transmissible torsional moments are moreover at a high level.

A further advantage is that the notch stresses of the sprag 3 represented in FIGS. 3 and 4 are low and in particular do not increase very sharply in the event of an overload on both lateral curves 9, 10, being moreover almost equal. The same notch stresses and the linear twist angle characteristic curve mean that a sprag-type freewheel clutch 4 fitted with the sprags 3 according to the invention is more durable and predictable by virtue of their constant characteristics, even in marginal ranges, and/or that fewer such sprags need to be fitted, which affords both mass and cost savings.

LIST OF REFERENCE NUMERALS 1 inner race
2 outer race
3 sprag
4 sprag-type freewheel clutch
5 profile
6 profile section
7 inner engagement curve
8 outer engagement curve
9 first lateral curve
10 second lateral curve
11 logarithmic spiral
12 straight segment
13 carrier straight line
14 first circular segment
15 second circular segment
16 first connecting circular section
17 second connecting circular section
18 third connecting circular section
19 fourth connecting circular section
20 angular distance
21 pitch circle
22 (unallocated)
23 spring element H gap size
b minimum width

The invention claimed is:

1. A sprag for a sprag-type freewheel clutch which has a gap height H between an inner race and an outer race, the sprag having a profile comprised of multiple profile sections and the sprag having at least the profile sections of an inner engagement curve, an outer engagement curve and a first and a second lateral curve, wherein the entire outer engagement curve and inner engagement curve form a component of the same logarithmic spiral wherein the first lateral curve is defined by a straight segment with an adjoining, inwardly convex pitch circle and that the second lateral curve is composed of two adjoining, oppositely convex circular segments.

2. The sprag of claim 1, wherein the angle covered by the outer engagement curve and the inner engagement curve is in each case 57° to 63°.

3. The sprag of claim 1, wherein the profile is designed so that the engagement curves and the lateral curves are in each case connected as profile sections formed by connecting circular sections.

4. The sprag of claim 1, wherein each profile section tangentially adjoins the next profile section.

5. The sprag of claim 4, wherein
the logarithmic spiral is defined by the parameters $$r(\varphi) = r_0 \exp(\varphi \cot(\frac{\pi}{2} - \alpha)) \text{ and } r_0 = \frac{H}{\cos\alpha}[1 + \exp(\pi \cot(\frac{\pi}{2} - \alpha))]^{-1},$$

where r denotes the radius and α the engagement angle of the sprag, measured between two parallel planes,
the abscissa is formed by the radius vector where $\phi=0°$, the ordinate by the radius vector where $\phi_0=90°$,
the outer engagement curve extends from $\phi_1=82°$ to $\phi_2=133°$,
the inner engagement curve extends from $\phi_3=261°$ to $\phi_4=320°$,
the first circular segment of the second lateral curve lies on the circle with the center $m_1$ having the coordinates (−0.3H; +0.5 μl) and the radius $r_1=0.7H$,
the pitch circle lies on a circle with the center $m_2$ having the coordinates (−0.4H; +0.2H) and the radius $r_2=0.3H$,
the second circular segment of the second lateral curve lies on a circle, the center $m_3$ of which is 0.9H away from the center of the pitch circle and 0.4H from the ordinate, between the outer and inner engagement curves, and its radius is $r_3=0.3H$,
the straight segment of the first lateral curve extends from the intersection of the pitch circle with the ordinate at an angle of $\beta=180°+42°$ in the direction of the inner engagement curve,
the connecting circular section, which connects the pitch circle to the outer engagement curve, has a radius of $r_4=0.1H$,
the connecting circular section, which connects the outer engagement curve to the first circular segment, has a radius of $r_5=<0.1$ H,
the connecting circular section, which connects the second circular segment to the inner engagement curve, has a radius of $r_6=<0.1$ H,
the connecting circular section, which connects the inner engagement curve to the straight segment, has a radius of $r_7=<0.1$ H.

6. The sprag of claim 4, wherein the logarithmic spiral is defined by the parameters $$r(\varphi) = r_0 \exp(\varphi \cot(\frac{\pi}{2} - \alpha)) \text{ and } r_0 = \frac{H}{\cos\alpha}[1 + \exp(\pi \cot(\frac{\pi}{2} - \alpha))]^{-1},$$

where r denotes the radius and α the engagement angle of the sprag, measured between two parallel planes,
the abscissa is formed by the radius vector where $\phi=0°$, the ordinate by the radius vector where $\phi=90°$,
the outer engagement curve extends from $\phi_1=80°$ to $\phi_2=142°$,
the inner engagement curve extends from $\phi_3=259°$ to $\phi_4=320°$,
the first circular segment of the second lateral curve lies on the circle with the center $m_1$ having the coordinates (−0.286 H; +0.508 H) and the radius $r_1=0.715$ H,
the pitch circle lies on a circle with the center $m_2$ having the coordinates (−0.429 H; +0.222 H) and the radius of $r_2=0.335$ H,
the second circular segment of the second lateral curve lies on a circle, the center $m_3$ of which is 0.929 H away from the center of the pitch circle and 0.373 H from the ordinate and between the outer and inner engagement curves, and its radius is $r_3=0.286$ H,
the straight segment of the first lateral curve extends from the intersection of the pitch circle with the ordinate at an angle of $\beta=180°+42°$ in the direction of the inner engagement curve,
the connecting circular section, which connects the pitch circle to the outer engagement curve, has a radius of $r_4=0.064$ H,
the connecting circular section, which connects the outer engagement curve to the first circular segment, has a radius of $r_5=0.048$ H,
the connecting circular section, which connects the second circular segment to the inner engagement curve, has a radius of $r_6=0.079$ H,
the connecting circular section, which connects the inner engagement curve to the straight segment, has a radius of $r_7=0.056$ H.

* * * * *